United States Patent
Shiomi et al.

US 6,645,019 B1
Nov. 11, 2003

(54) OUTBOARD ENGINE SYSTEM

(75) Inventors: Kazuyuki Shiomi, Wako (JP); Tetsuro Ikeno, Wako (JP); Taiichi Otobe, Wako (JP); Kunihiro Kitsu, Wako (JP); Hiroshi Mizuguchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 26 days.

(21) Appl. No.: 10/088,084
(22) PCT Filed: Sep. 22, 2000
(86) PCT No.: PCT/JP00/06531
§ 371 (c)(1), (2), (4) Date: Mar. 21, 2002
(87) PCT Pub. No.: WO01/21482
PCT Pub. Date: Mar. 29, 2001

(30) Foreign Application Priority Data

Sep. 24, 1999 (JP) .................... 11-270875

(51) Int. Cl.[7] .......................... B63H 1/15
(52) U.S. Cl. ................................ 440/52
(58) Field of Search .......................... 440/52

(56) References Cited

U.S. PATENT DOCUMENTS 5,850,764 A  12/1998  Bostelmann et al.

FOREIGN PATENT DOCUMENTS

| JP | 63-192693 | 8/1988 |
|----|-----------|--------|
| JP | 2-37096 | 2/1990 |
| JP | 5-278685 | 10/1993 |
| JP | 7-4425 | 1/1995 |
| JP | 7-61797 | 7/1995 |
| JP | 8-285015 | 11/1996 |
| JP | 2710346 | 10/1997 |
| JP | 2710347 | 10/1997 |
| JP | 10-252496 | 9/1998 |
| JP | 2885293 | 2/1999 |
| JP | 2892074 | 2/1999 |
| JP | 2905257 | 3/1999 |
| JP | 11-99990 | 4/1999 |

*Primary Examiner*—Jesus D. Sotelo
(74) *Attorney, Agent, or Firm*—Arent Fox Kintner Plotkin & Kahn, PLLC

(57) ABSTRACT

In an outboard engine system, an inertia force a generated longitudinally by a piston 14 is countervailed by an inertia force b generated by a crankshaft 15, and inertia forces c and d subsidiarily laterally generated vibrate a body of the outboard engine system laterally about a phantom center point C of vibration. At this time, an elastomeric member 74 resiliently supporting the system body on a hull has a rigidity in a tangent direction (in the direction of $L_3$) about the phantom center point C of vibration, which is set to be lower than a rigidity in a radial direction (in the direction of $L_2$) about the phantom center point C of vibration. Therefore, the lateral vibration is reduced effectively due to the lower rigidity of the elastomeric member 74. Thrusts e and f generated by a propeller and acting in a longitudinal direction (in the direction of $L_1$) are transmitted to the hull through the elastomeric member 74. However, the rigidity of the elastomeric member 74 in the longitudinal direction is set to be higher and hence, the thrusts e and f can be transmitted effectively to the hull.

4 Claims, 16 Drawing Sheets

OUTBOARD ENGINE SYSTEM

FIELD OF THE INVENTION

The present invention relates to an outboard engine system including an engine having a crankshaft disposed vertically and a cylinder axis disposed longitudinally.

BACKGROUND ART

In general, an outboard engine system includes a body frame on which an engine is mounted, and which is detachably mounted to a hull through a mounting bracket. The engine is mounted vertically on the body frame with a crankshaft facing vertically and with a cylinder axis facing longitudinally, so that the transmission of a power to a drive shaft disposed vertically within the body frame can be conducted easily.

The vibration generated by the operation of the engine is transmitted from the body frame through the mounting bracket to the hull, but to reduce the vibration, the body frame is supported on the mounting bracket through an elastomeric member. A thrust generated by a propeller of the outboard engine system is transmitted from the body frame through the elastomeric member to the mounting bracket and further transmitted from the mounting frame to the hull. Therefore, it is required that the elastomeric member should meet conflicting demands that the thrust generated by the propeller is transmitted effectively from the body frame to the mounting bracket, while the transmission of the vibration from the body frame to the mounting bracket is reduced effectively.

One of techniques for meeting the demands is to reduce the vibration itself generated by the engine. For example, in a 2-cylinder and 4-cycle engine, it is common that two pistons are disposed at the same crank phase, and the ignition is conducted at equal intervals with ignition timings displaced by 360°. To reduce the primary vibration generated by the engine, an outboard engine system has been proposed in Japanese Patent Application Laid-open No.63-192693, in which the rotational mass of counterweights of the crankshaft relative to the reciprocation mass of the piston is determined at 50%, and a balancer shaft reversed at the same speed as the crankshaft has the remaining 50%.

Another technique for meeting the demands is to ensure that the rigidity of the elastomeric member supporting the body frame to the mounting bracket has an anisotropy. Thus, an outboard engine system has been proposed in Japanese Patent Application Laid-open No.2-37096, wherein the rigidity of an elastomeric member is set to be large in a direction to transmit a thrust generated by a propeller to a hull (i.e., in a longitudinal direction) and small in a direction perpendicular to such direction (i.e., in a lateral direction), thereby preventing the transmission of the lateral vibration to the hull, while permitting the thrust to be transmitted effectively to the hull.

However, the outboard engine system described in Japanese Patent Application Laid-open No.63-192693 suffers from not only a problem that it is necessary to add a special balancer device and hence, the weight and the cost are increased, but also a problem that a power transmitting system such as a gear for driving a balancer shaft in operative association with a crankshaft generates a noise.

The outboard engine system described in Japanese Patent Application Laid-open No.2-37096 suffers from the following problem: The elastomeric members are disposed at two points on opposite sides of a vertical axis (a torque rolling axis) extending through the center of gravity of the engine, so that a torque reaction generated in the crankshaft with the operation of the engine can be supported. For this reason, the positions of the elastomeric members are at a central portion of the outboard engine system and are liable to interfere with other equipments. This is inconvenient in respect of the layout.

DISCLOSURE OF THE INVENTION

The present invention has been accomplished with the above circumstances in view, and it is an object of the present invention to provide an outboard engine system, wherein a thrust generated by a propeller can be transmitted effectively to a hull, while effectively reducing the transmission of the vibration generated by an engine.

To achieve the above object, according to the present invention, there is provided an outboard engine system comprising a system body, an engine mounted on the system body, a mounting means detachably mounted to a hull, and a mount device having a pair of left and right elastomeric members for supporting the system body on the mounting means, characterized in that the engine is disposed, so that a crankshaft is disposed vertically, and a cylinder head disposed to face rearwards with a cylinder axis disposed in a longitudinal direction parallel to a propeller shaft, and so that a rate of balance between the reciprocal inertia mass of a piston and a rotational inertia mass of the crankshaft is set at approximately 100%; the elastomeric members are disposed on left and right opposite sides of the engine, and the rigidity of the mount device is set so that the rigidity in a tangent direction about a phantom center point of vibration in a high rotational speed range of the engine is lower than the rigidity in a radial direction about the phantom center point of vibration.

With the above arrangement, a longitudinal inertia force generated by the reciprocal inertia mass of the piston is converted into a lateral inertia force by the rotational inertia mass of the crankshaft. The lateral inertia force vibrates the system body having the engine mounted thereon laterally about the phantom center point of vibration. At this time, the rigidity of the mount device having the elastomeric members disposed on left and right opposite sides of the engine to resiliently support the system body on the mounting means mounted on the hull is set, so that the rigidity in the tangent direction about the phantom center point of vibration is set to be lower than the rigidity in the radial direction about the phantom center point of vibration and hence, the lateral vibration about the phantom center point of vibration can be reduced effectively due to the low rigidity of the mount device to improve the riding comfort on the hull. A thrust acting in the longitudinal direction parallel to the propeller shaft is transmitted to the hull through the mount device, but the rigidity of the mount device in the direction of the thrust is set at a high value and hence, the thrust can be transmitted effectively to the hull due to the high rigidity of the mount device.

In addition to the above arrangement, there is also provided an outboard engine system, wherein an angle formed by a straight line extending forwards from the phantom center point of vibration with a straight line extending from the phantom center point of vibration toward the elastomeric member is smaller than 45°.

With the above arrangement, the angle formed by the straight line extending forwards from the phantom center point of vibration with the straight line extending from the phantom center point of vibration toward the elastomeric member is smaller than 45°. Therefore, the deviation between the direction of the thrust (the direction of the straight line extending forwards from the phantom center point of vibration) and the direction in which the rigidity of the mount device is highest (the direction of the straight line extending from the phantom center point of vibration toward the elastomeric member) can be decreased, whereby the thrust can be transmitted further effectively to the hull.

According to the present invention, there is provided an outboard engine system comprising a system body, an engine mounted on the system body, a swivel shaft for pivotally supporting the system body on a hull, a mount arm integral with the swivel shaft, a mount device having a pair of left and right elastomeric members for supporting the system body on the mount arm, and a steering handlebar connected to the mount arm to swing the system body about the swivel shaft, characterized in that the engine is disposed, so that a crankshaft is disposed vertically, and a cylinder head is disposed to face rearwards with a cylinder axis disposed in a longitudinal direction parallel to a propeller shaft, and so that a rate of balance between the reciprocal inertia mass of a piston and a rotational inertia mass of the crankshaft is set at approximately 100%; the elastomeric members are disposed on left and right opposite sides of the engine; the rigidity of the mount device is set so that the rigidity in a tangent direction about a phantom center point of vibration in a high rotational speed range of the engine is lower than the rigidity in a radial direction about the phantom center point of vibration; and the swivel shaft is disposed on an arc of a circle extending through the elastomeric members about the phantom center point of vibration.

With the above arrangement, a longitudinal inertia force generated by the reciprocal inertia mass of the piston is converted into a lateral inertia force by the rotational inertia mass of the crankshaft. The lateral inertia force vibrates the system body having the engine mounted thereon laterally about the phantom center point of vibration. At this time, the rigidity in the mount device having the elastomeric members disposed on the left and right opposite sides of the engine to resiliently support the system body on the hull is set, so that the rigidity in the tangent direction about the phantom center point of vibration is lower than the rigidity in the radial direction about the phantom center point of vibration and hence, the lateral vibration about the phantom center point of vibration can be reduced effectively due to the low rigidity of the mount device to improve the riding comfort on the hull. A thrust acting in the longitudinal direction parallel to the propeller shaft is transmitted to the hull through the mount device, but the rigidity of the mount device in the direction of the thrust is set at a high value and hence, the thrust can be transmitted effectively to the hull due to the high rigidity of the mount device. Moreover, the swivel shaft is disposed on the arc of the circle extending through the elastomeric members about the phantom center point of vibration and hence, the mount arm can be prevented from being swung about the swivel shaft by the vibration transmitted through the mount device to the mount arm, thereby suppressing the transmission of the vibration to the steering handlebar connected to the mount arm to the minimum.

In addition to the above arrangement, there is provided an outboard engine system, further including a cover member fastened to a rear surface of a lower end of an extension case connected to the system body to define a space with a horizontal section closed, and a mount block which is mounted at a lower end of the swivel shaft and retained in the space.

With the above arrangement, a box-shaped structure of a high rigidity with the horizontal section closed is provided by fastening the cover member to the extension case and hence, the mount block can be firmed retained within the structure to effectively prevent the generation of resonance.

Meanwhile, an engine-supporting block 41 in an embodiment corresponds to the system body of the present invention; a mounting bracket 55 in the embodiment corresponds to the mounting means of the present invention; an upper mount 65 in the embodiment corresponds to the mount device of the present invention; an upper mount rubber member 74 in the embodiment corresponds to the elastomeric member of the present invention.

BRIEF DESCRIPTION OF THE DRAWINGS

FIG. 1 is a side view of the entire arrangement of an outboard engine system;

FIG. 2 is an enlarged sectional view of an essential portion shown in FIG. 1;

FIG. 3 is a sectional view taken along a line 3—3 in FIG. 2;

FIG. 4 is an enlarged view of the essential portion shown in FIG. 1;

FIG. 5 is a sectional view taken along a line 5—5 in FIG. 4;

FIG. 6 is a sectional view taken along a line 6—6 in FIG. 2;

FIG. 7 is an enlarged sectional view of an essential portion shown in FIG. 6;

FIG. 8 is a sectional view taken along a line 8—8 in FIG. 7;

FIG. 9 is a sectional view taken along a line 9—9 in FIG. 7;

FIG. 10 is a perspective view of an upper mount rubber member;

FIG. 11 is an enlarged sectional view of the essential portion show in FIG. 1;

FIG. 12 is a view taken in the direction of an arrow 12 in FIG. 11;

FIG. 13 is a sectional view taken along a line 13—13 in FIG. 11; and

FIG. 14 is a diagram for explaining a vibration-reducing effect.

FIG. 15 is a similar to FIG. 12; and

FIG. 16 is a sectional view taken along a line 16—16 in FIG. 15.

BEST MODE FOR CARRYING OUT THE INVENTION

The present invention will now be described by way of embodiments with reference to the accompanying drawings.

Figure 1:
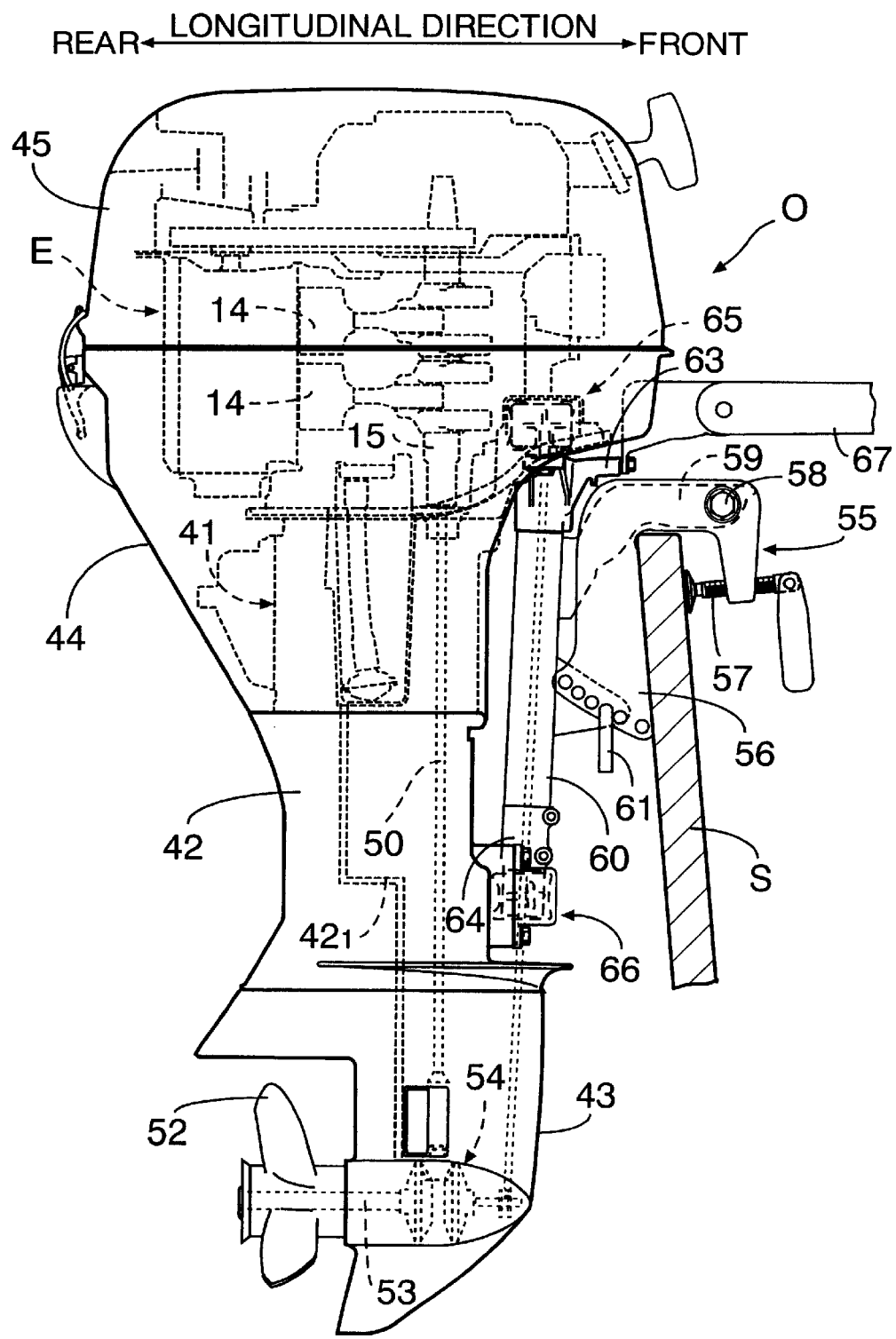
FIGS. 1 to 14 show an embodiment of the present invention.
Figure 2:
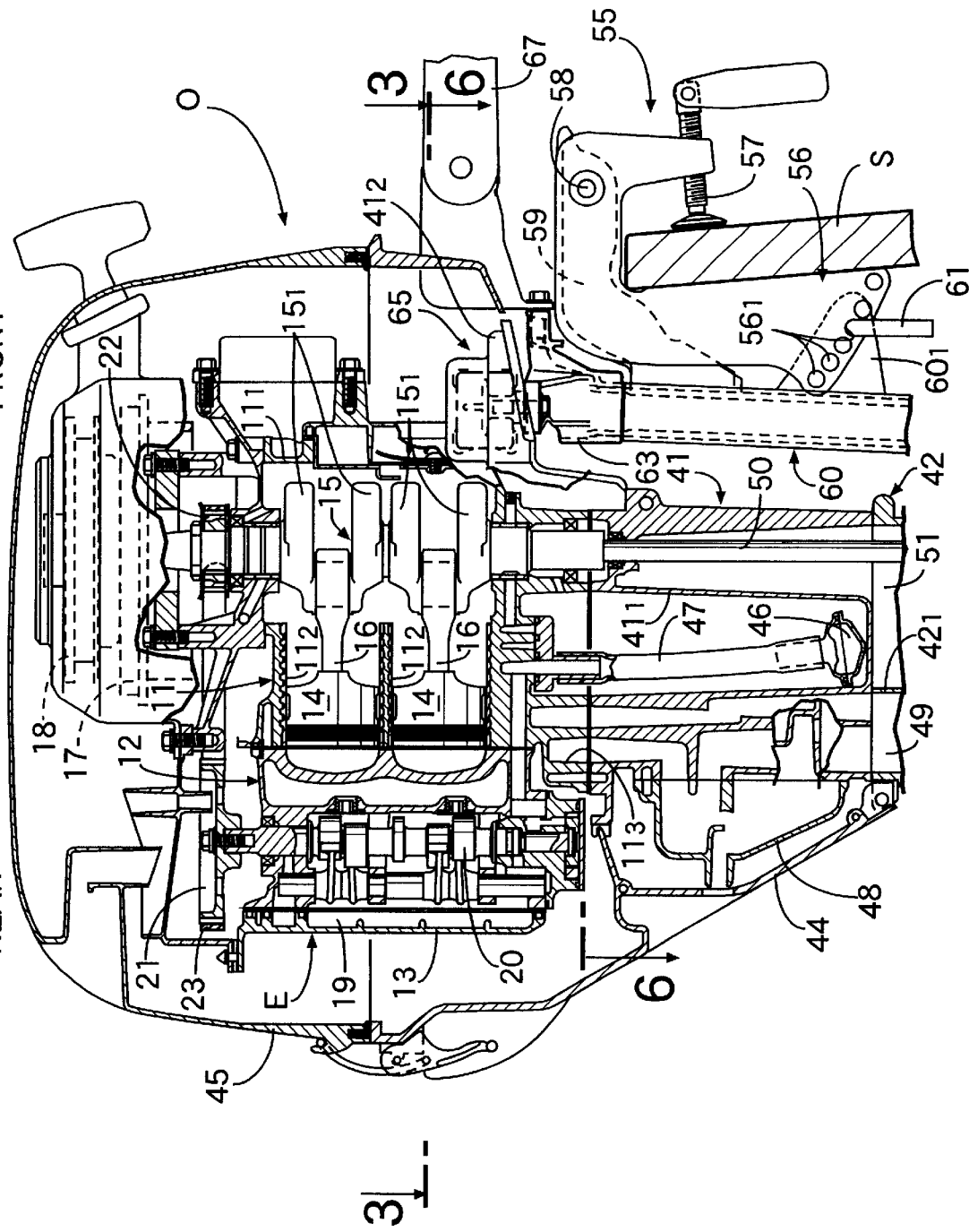
Figure 3:
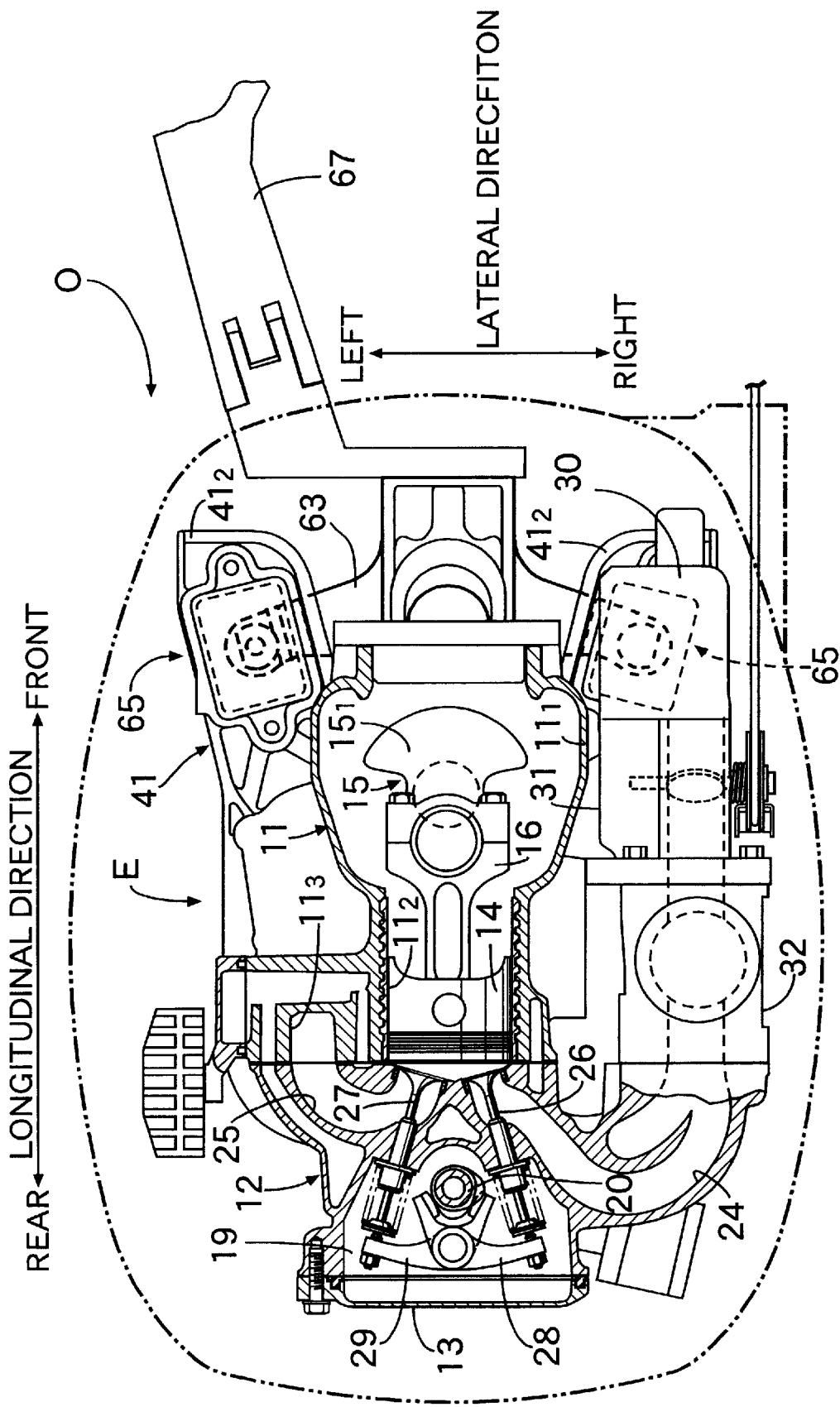

As shown in FIGS. 1 to 3, a 2-cylinder and 4-cycle engine E mounted at an upper portion of an outboard engine system O includes a cylinder block 11 integrally provided with a crankcase $11_1$, a cylinder head 12 coupled to the cylinder block 11, and a head cover 13 coupled to the cylinder head 12. Two pistons 14, 14 slidably received in two cylinder bores $11_2$, $11_2$ defined in the cylinder block 11 are connected through connecting rods 16, 16 to a crankshaft 15 supported in the cylinder block 11.

A generator 17 and a recoil starter 18 are mounted coaxially on an end of the crankshaft 15 protruding upwards from the cylinder block 11. A camshaft 20 is supported in a valve-operating chamber 19 defined between the cylinder head 12 and the head cover 13, and a cam pulley 21 mounted at an upper end of the camshaft 20 and a crank pulley 22 mounted at an upper portion of the crankshaft 15 are connected to each other by a timing belt 23. An intake valve 26 and an exhaust valve 27 for opening and closing an intake port 24 and an exhaust port 25 defined in the cylinder head 12 respectively are connected to the camshaft 20 through an intake rocker arm 28 and an exhaust rocker arm 29, respectively. An air cleaner 30, a throttle valve 31 and a carburetor 32 disposed on a right side of the engine E are connected to the intake port 24.

An axis of the crankshaft 15 is disposed vertically, and axes of the cylinder bores $11_2$, $11_2$ are disposed longitudinally, so that a portion of each cylinder bore $11_2$ on the side of the crankcase $11_1$ faces forwards and a portion of each cylinder bore $11_2$ on the side of the cylinder head 12 faces rearwards. The crank phases of the two pistons 14, 14 are the same as each other, and the ignition timings provided by the pistons 14, 14 are deviated from each other by 360°. Counterweights $15_1$ having a balance rate of 100% for opposing the reciprocal movement mass of the pistons 14, 14 are mounted on the crankshaft 15. Therefore, a longitudinal primary vibration generated with the reciprocal movement of the pistons 14, 14 is countervailed by the rotating movement of the counterweights $15_1$ of the crankshaft 15, and in place of it, a lateral primary vibration is generated with the rotating movement of the counterweights $15_1$. The engine E is not provided with a balancer device other than the counterweights $15_1$ of the crankshaft 15 and hence, the vibration generated by the engine E is small in the longitudinal direction and large in the lateral direction.

An upper surface of an engine-supporting block 41 is coupled to a lower surface of the engine E having the above-described structure. An upper surface of an extension case 42 is coupled to a lower surface of the engine-supporting block 41, and an upper surface of a gear case 43 is coupled to a lower surface of the extension case 42. An outer periphery of the engine-supporting block 41 and an outer periphery of a lower half of the engine E are covered with an undercover 44 coupled to an upper end of the extension case 42, and an upper half of the engine E is covered with an engine cover 45 coupled to an upper end of the undercover 44.

The engine-supporting block 41 is integrally provided with an oil pan $41_1$, and a suction pipe 47 provided with an oil strainer 46 is accommodated in the oil pan $41_1$. An exhaust passage-defining member 48 is coupled to a rear surface of the engine-supporting block 41, and an exhaust gas expansion chamber 49 is defined in the extension case 42 through a partition wall $42_1$. An exhaust gas discharged from the exhaust port 25 is supplied through an exhaust passage $11_3$ defined in the cylinder block 11 into the exhaust passage-defining member 48 and discharged therefrom into the outside water via the exhaust gas expansion chamber 49 in the extension case 42 and a hollow in a propeller shaft 53 which will be described hereinafter.

A drive shaft 50 connected to a lower end of the crankshaft 15 is passed through the engine-supporting block 41, extends downwards within a drive shaft chamber 51 defined in the extension case 42, and is connected through a forward/backward changeover mechanism 54 to a front end of the propeller shaft 53 which is provided at its rear end with a propeller 52 and supported longitudinally on the gear case 43.

Figure 4:
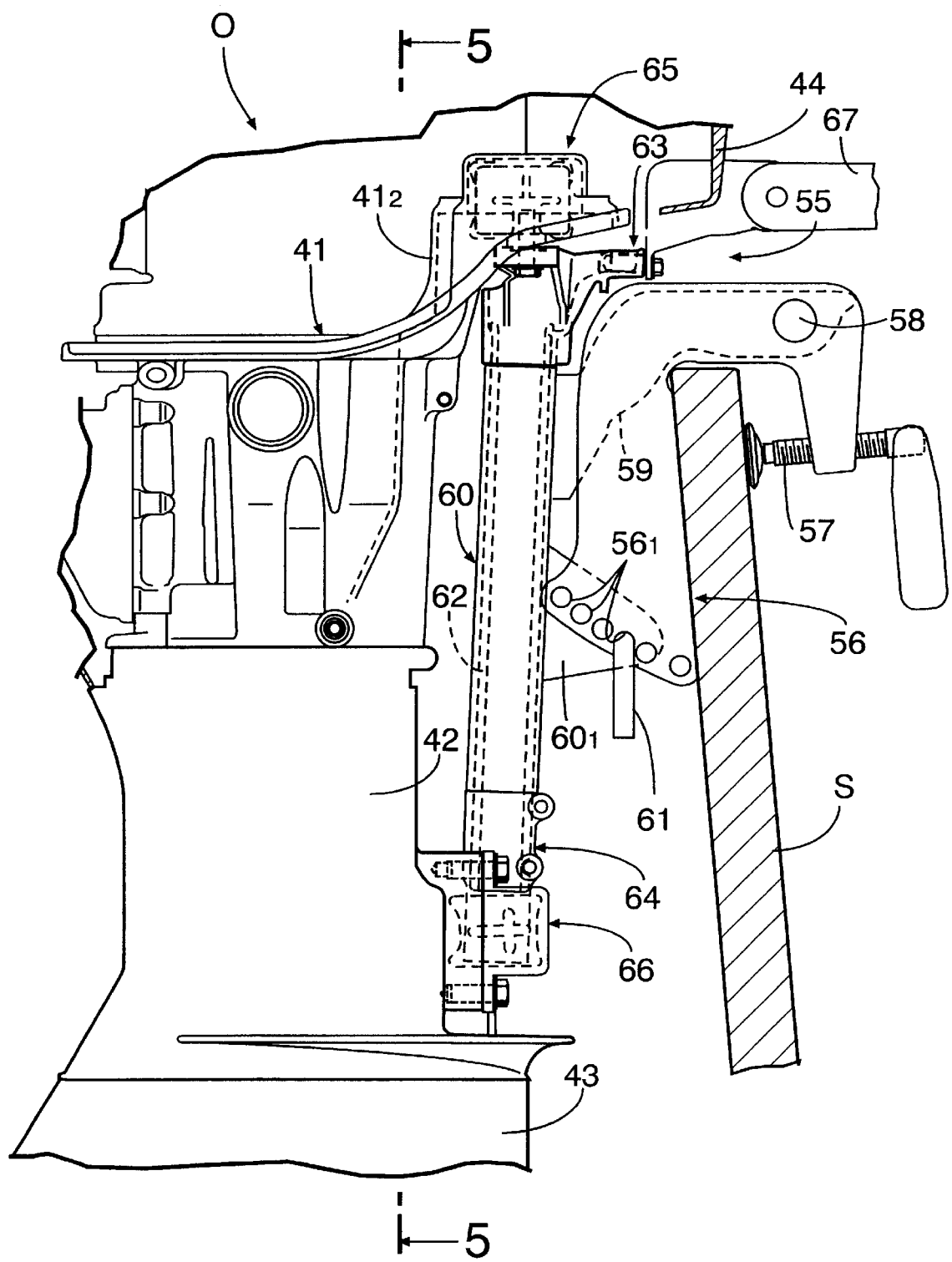
Figure 5:
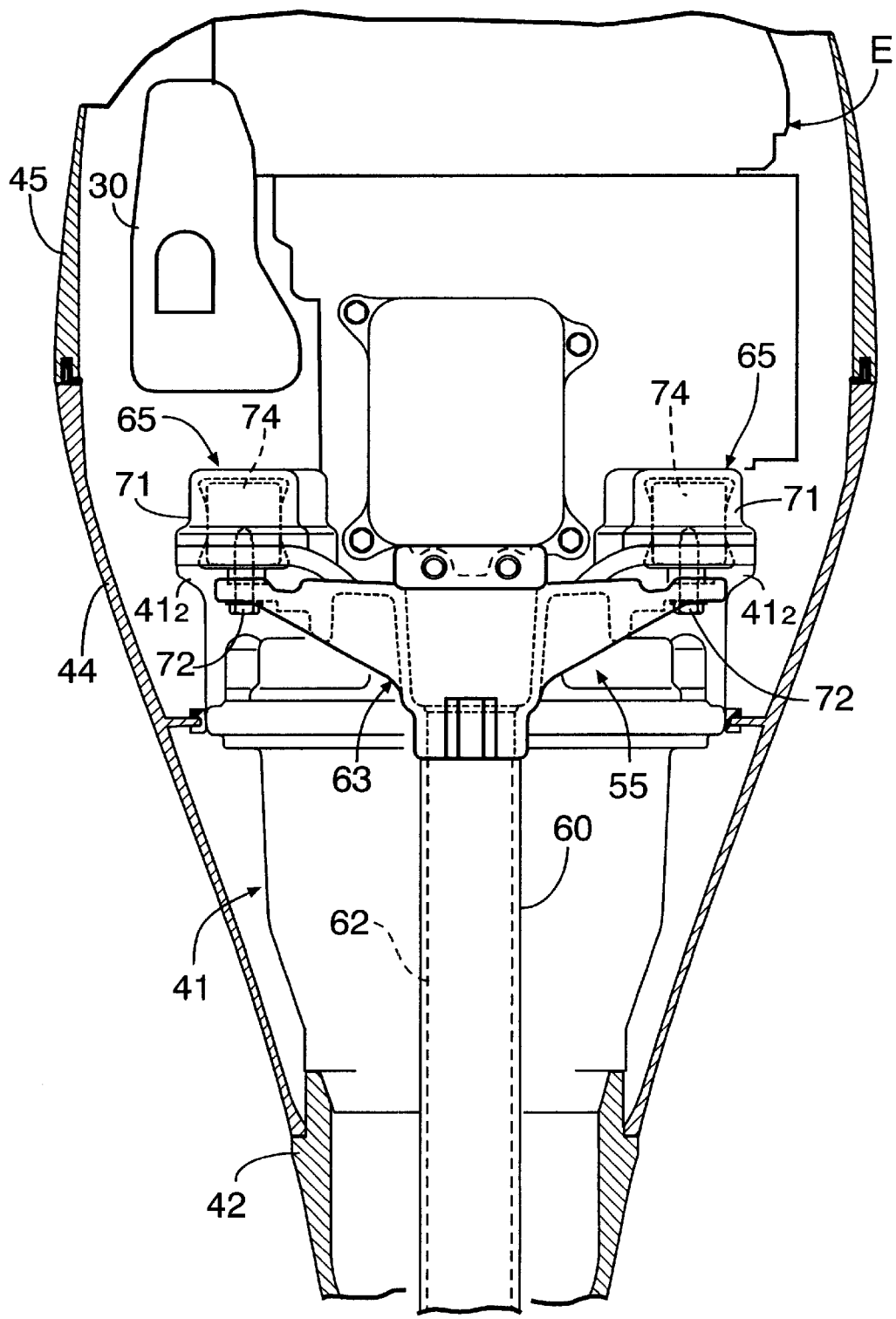
Figure 6:
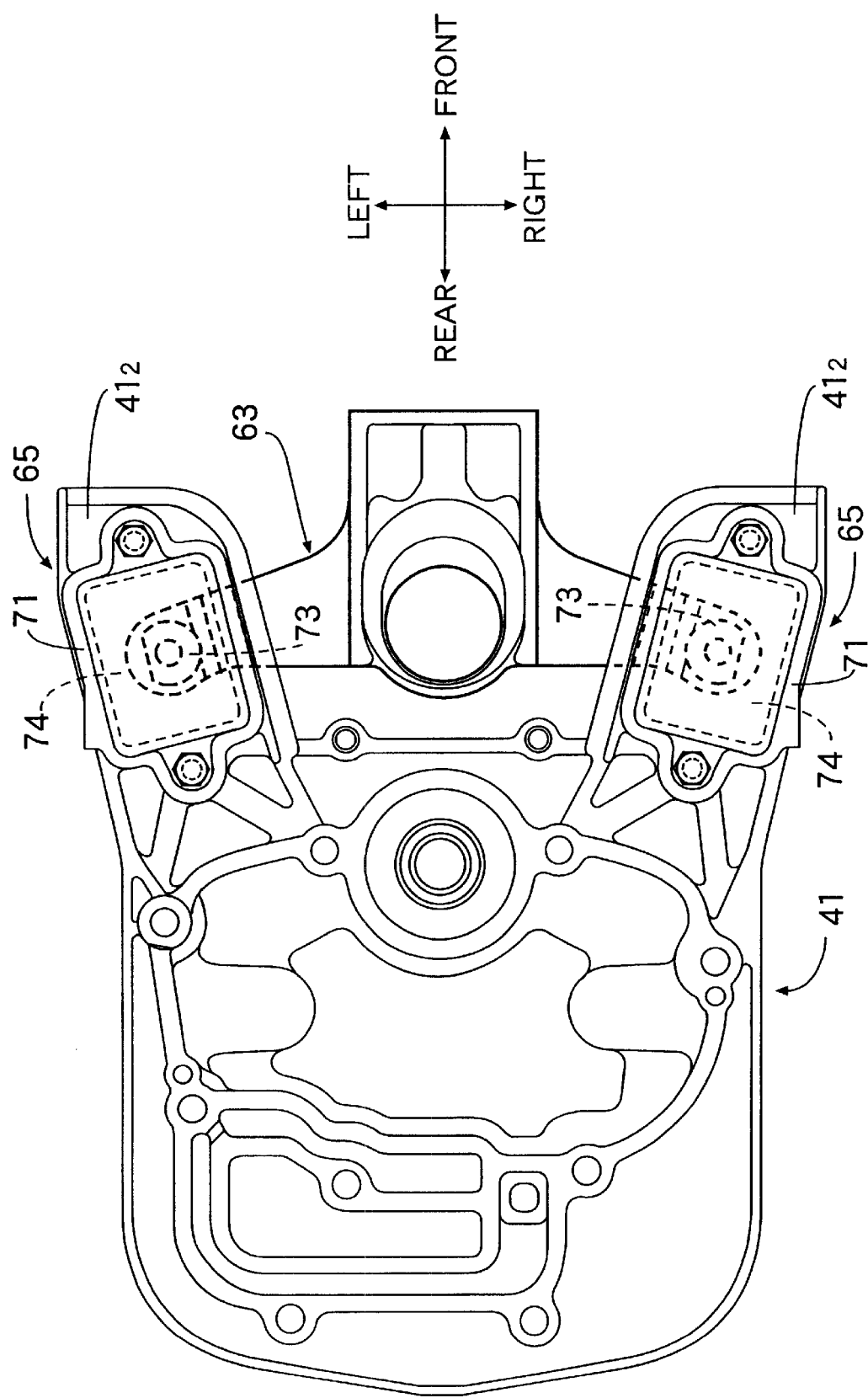
Figure 7:
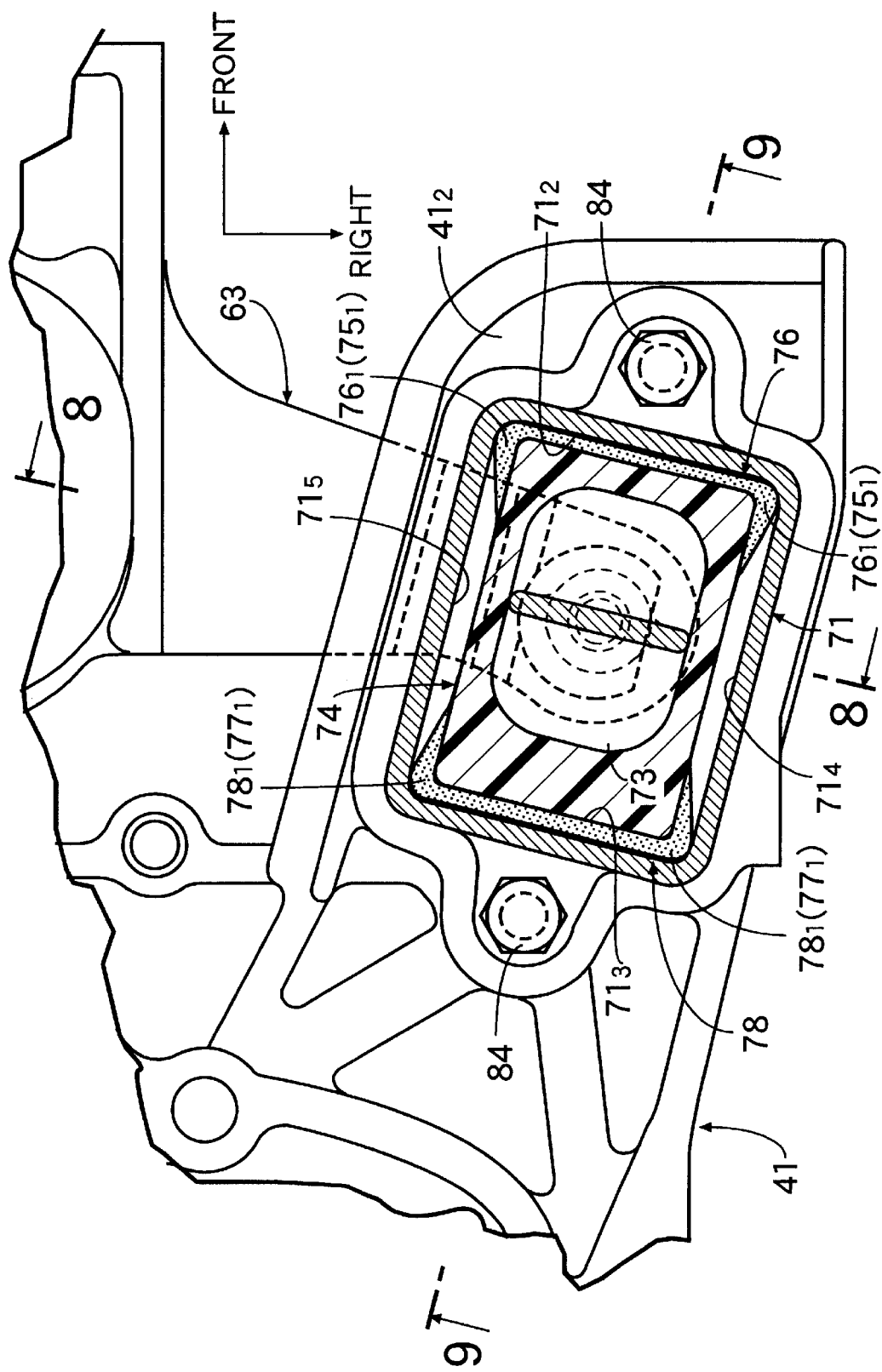

As can be seen from FIGS. 4 and 5, a mounting bracket 55 for detachably mounting the outboard engine system O to a hull S includes an inverted J-shaped mounting bracket body 56 and a set screw 57 threadedly engaged with the mounting bracket body 56. A swinging arm 59 is pivotally supported at its front end on the mounting bracket body 56 through a pivot pin 58, and a pipe-shaped swivel case 60 is integrally coupled to a rear end of the swinging arm 59. A large number of pinholes $56_1$ are provided in the mounting bracket body 56, so that the tilting angle of the outboard engine system O about the pivot pin 58 can be regulated by inserting a pin 61 through a pinhole made in a locking plate $60_1$ fixed to the swivel case 60 and any one of the pinholes $56_1$ in the mounting bracket body 56.

A swivel shaft 62 relatively rotatably fitted in the swivel case 60 includes a mount arm 63 and a mount block 64 at its upper and lower ends, respectively. The upper mount arm 63 is resiliently connected to the engine-supporting block 41 through a pair of left and right upper mounts 65, 65, and the lower mount block 64 is resiliently connected to the extension case 42 through a lower mount 66. A steering handlebar 67 is fixed to a front end of the engine-supporting block 41, so that the engine-supporting block 41 can be swung laterally about the swivel shaft 62 to steer the outboard engine system O by grasping the steering handlebar 67 to operate it laterally.

The structure of the upper mounts 65, 65 will be described below with reference to FIGS. 5 to 10 and 14.

The engine-supporting block 41 includes a pair of left and right protrusions $41_2$, $41_2$ overhanging forwards and upwards, and rubber member-accommodating portions 71, 71 are formed on the protrusions $41_2$, $41_2$, respectively. Each of the rubber member-accommodating portions 71, 71 is a recess including an upper wall $71_1$, a front wall $71_2$, a rear wall $71_3$, an outer wall $71_4$ and an inner wall $71_5$, and only a lower surface thereof is opened. On the other hand, substantially rectangular parallelepiped upper mount rubber members 74, 74 are mounted to cover the peripheries of metal cores 73, 73 fixed to left and right opposite ends of the mount arm 63 by bolts 72, 72. The upper mount rubber members 74, 74 are fitted into the rubber member-accommodating portions 71, 71 in the engine-supporting block 41 from below. Restraining lids 83, 83 are fixed in the opened lower surfaces of the rubber member-accommodating portions 71, 71 by bolts 84 to prevent the upper mount rubber members 74, 74 from being dropped from the rubber member-accommodating portions 71, 71.

Figure 14:
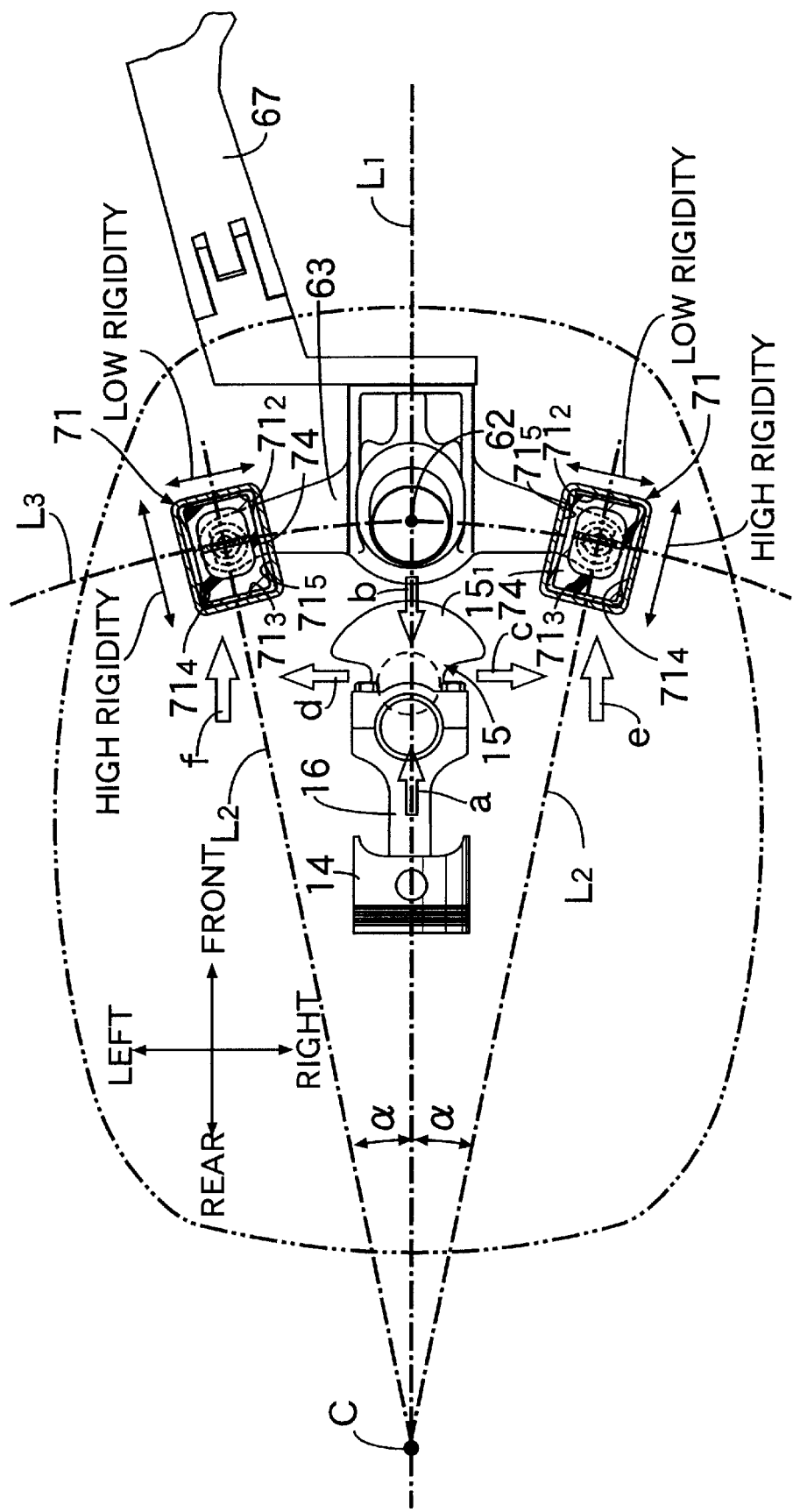

As can be seen from FIG. 14, a phantom center point C of a primary vibration in a high rotational speed range (of 3,000 rpm or more) of the engine E lies at a rear portion of the outboard engine system O, and a straight line $L_1$ extending forwards from the phantom center point C is matched with a cylinder axis. The outer walls $71_4$, $71_4$ and the inner walls $71_5$, $71_5$ of the rubber member-accommodating portions 71, 71 are parallel to straight lines $L_2$, $L_2$ extending from the phantom center point C of the primary vibration toward the centers of the upper mount rubber members 74, 74, respectively, and the front walls $71_2$, $71_2$ and the rear walls $71_3$, $71_3$ of the rubber member-accommodating portions 71, 71 are perpendicular to the straight lines $L_2$, $L_2$. Angles α, α formed by the straight line $L_1$ and the straight line $L_2$, $L_2$ are set at small values (smaller than 45°). Reference character $L_3$ indicates an arc of a circle extending through the centers of the upper mount rubber members 74, 74 about the phantom center point C, and the swivel shaft 62 is located on the arc $L_3$.

Figure 10:
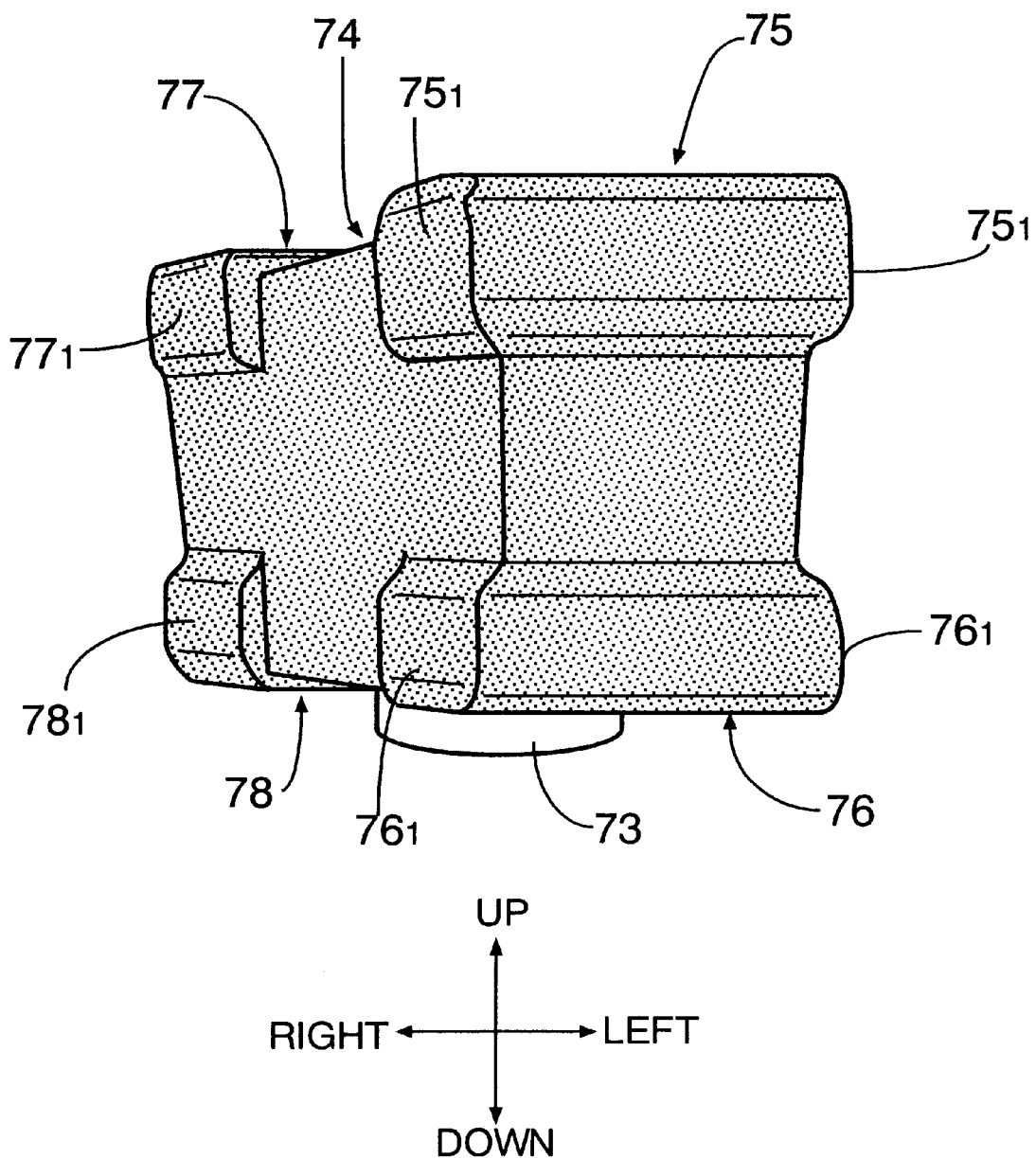

As can be seen from FIG. 10, each of the upper mount rubber members 74 includes upper and lower projections 75 and 76 located at front portion thereof and extending laterally, and upper and lower projections 77 and 78 located at a rear portion thereof and extending laterally. Convex portions $75_1, 75_1$ are further formed at opposite ends of the projection 75 to protrude laterally; convex portions $76_1, 76_1$ are further formed at opposite ends of the projection 76 to protrude laterally; convex portions $77_1, 77_1$ are further formed at opposite ends of the projection 77 to protrude laterally; and convex portions $78_1, 78_1$ are further formed at opposite ends of the projection 78 to protrude laterally.

Figure 8:
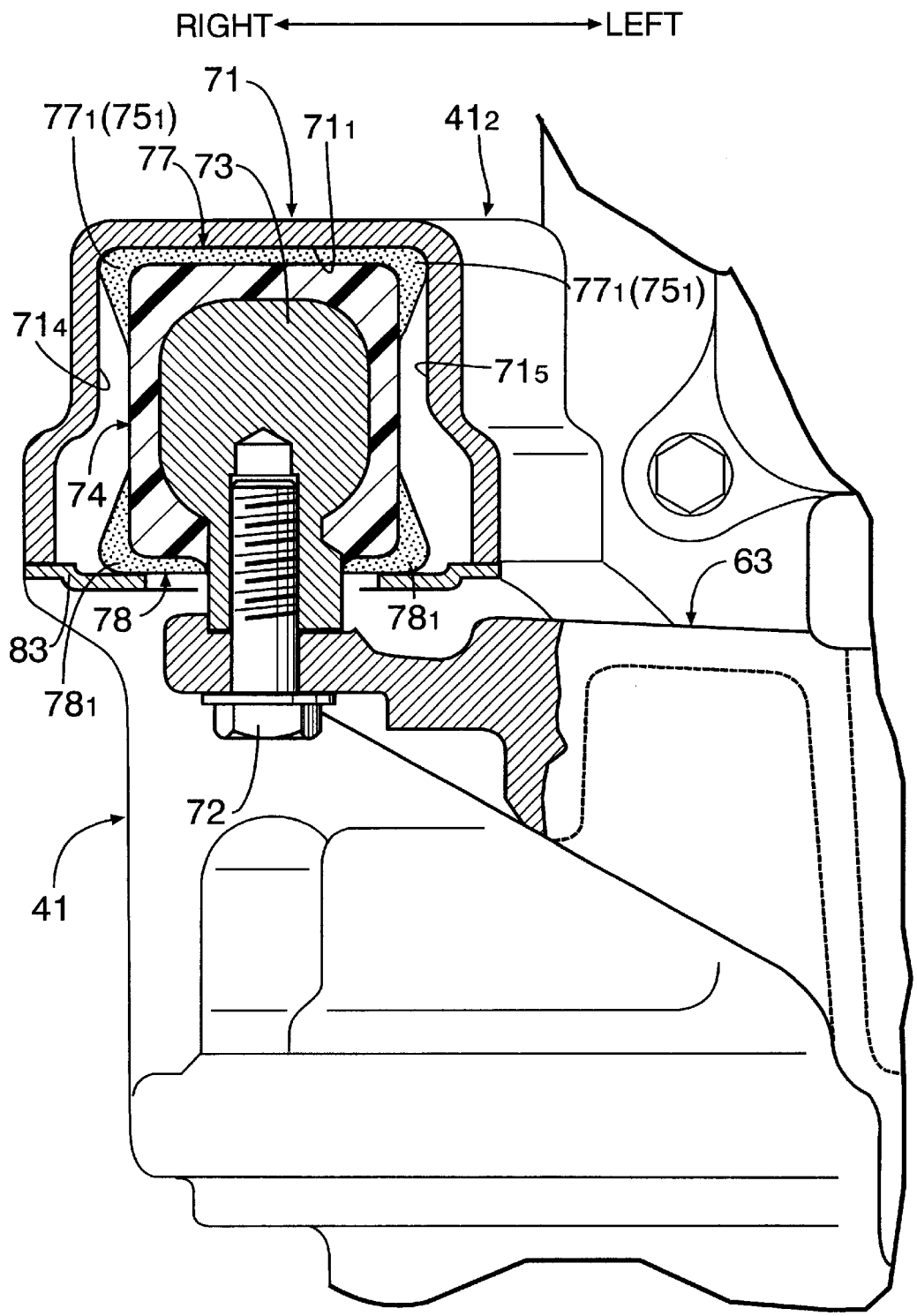
Figure 9:
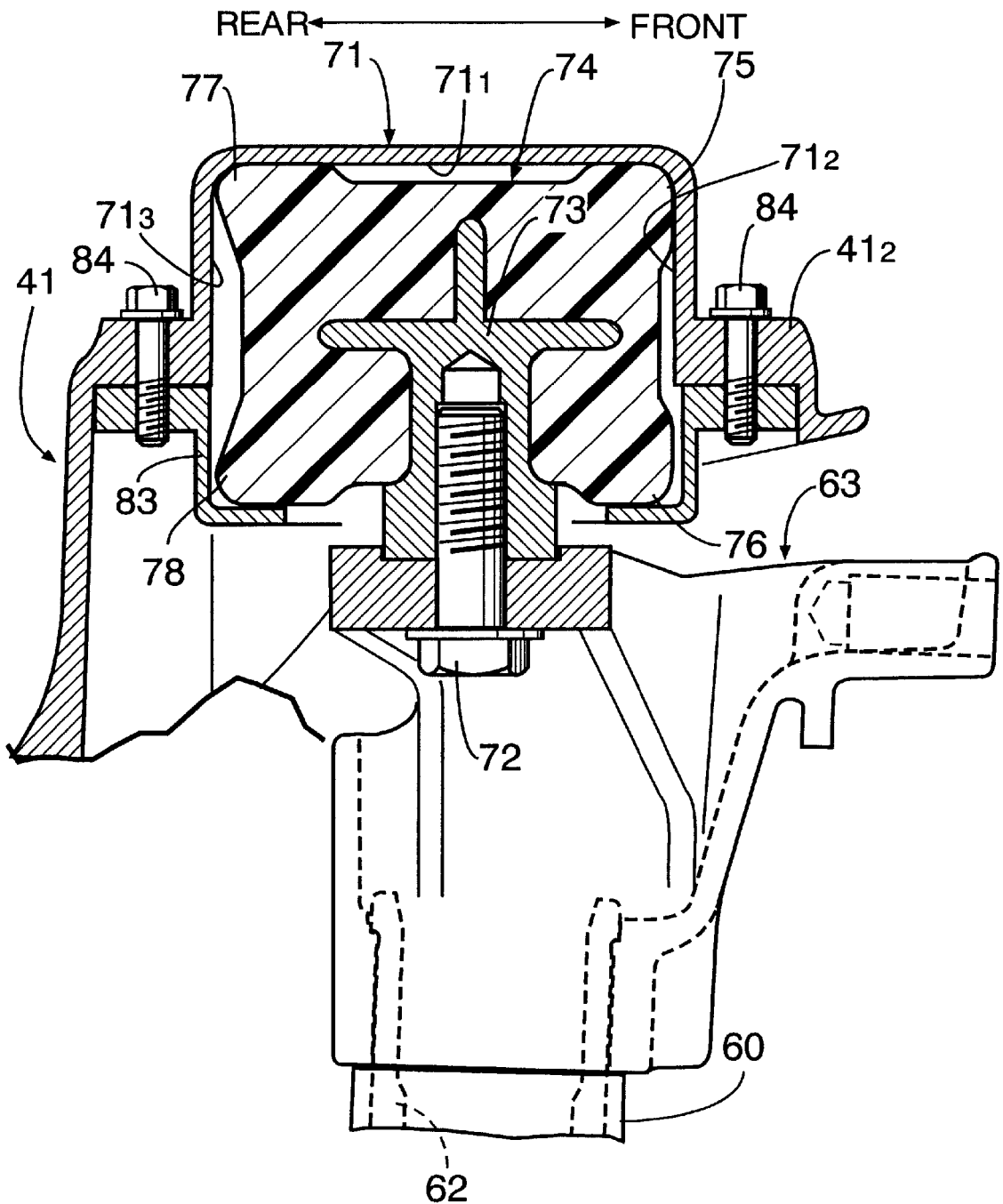

The entire surfaces of the upper two projections 75 and 77 are in line contact with the front wall $71_2$ and the rear wall $71_3$ of the rubber member-accommodating portion 71 (see FIG. 9). Therefore, when a load in a longitudinal direction (exactly in the direction of the straight line $L_3$ in FIG. 14) is applied to the upper mount 65, the entire projections 75 and 77 are crushed and hence, the upper mount rubber member 74 exhibits a relatively large rigidity. On the contrast, the convex portions $75_1, 75_1; 77_1, 77_1$ (see FIG. 7 and 8) at the left and right opposite ends of the upper two projections 75 and 77 are merely in point contact with the outer wall $71_4$ and the inner wall $71_5$ of the rubber member-accommodating portion 71. When a load in a lateral direction (exactly in the direction of the arm $L_3$ in FIG. 14) is applied to the upper mount 65, the convex portions $75_1, 75_1; 77_1, 77_1$ are easily compressed, and hence, the upper mount rubber member 74 exhibits a relatively small rigidity. Namely, the rigidity of the upper mount rubber member 74 has an anisotropy and is higher in the direction of the straight line $L_2$ and lower in the direction of the arc $L_3$ (in a tangent direction about the phantom center point C).

A gap is provided between each of the lower two projections 76 and 78 and the wall surface of the rubber member-accommodating portion 71, but when a large load in the lateral direction is applied to the upper mount rubber member 74 to largely deform it, the two projections 76 and 78 are brought into contact with the wall surface of the rubber member-accommodating portion 71 to exhibit a load-supporting function (see FIG. 8).

Figure 11:
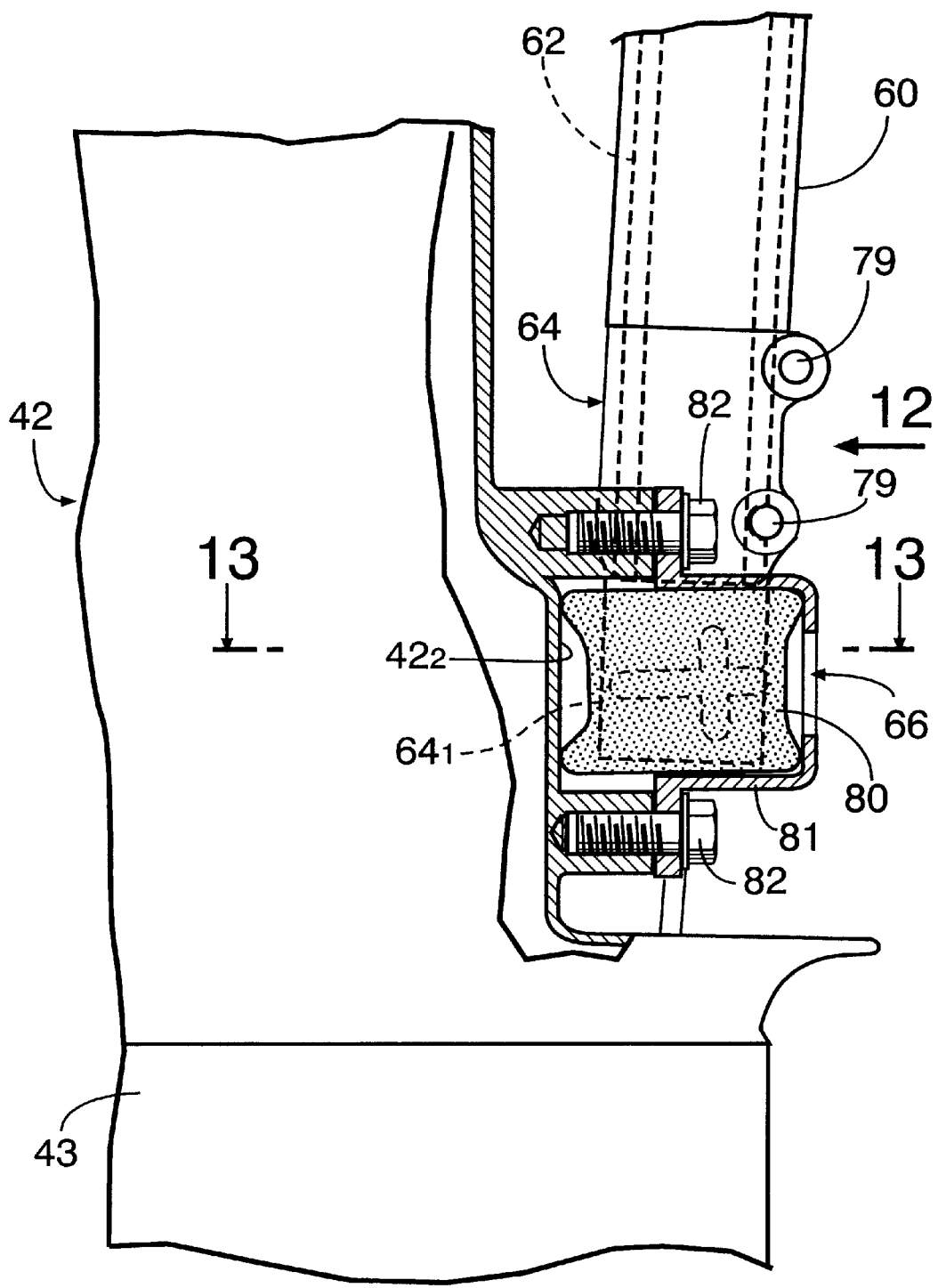
Figure 12:
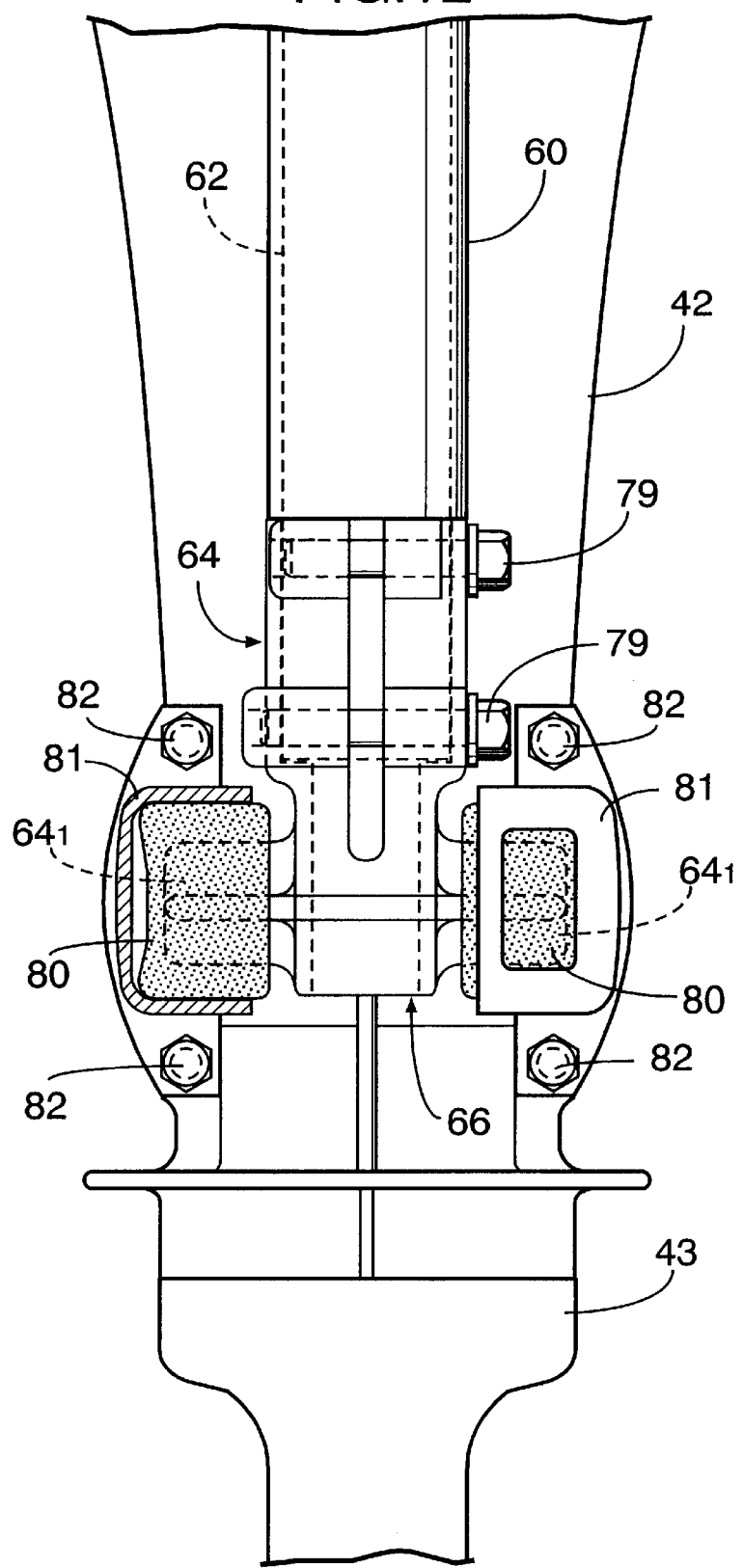
Figure 13:
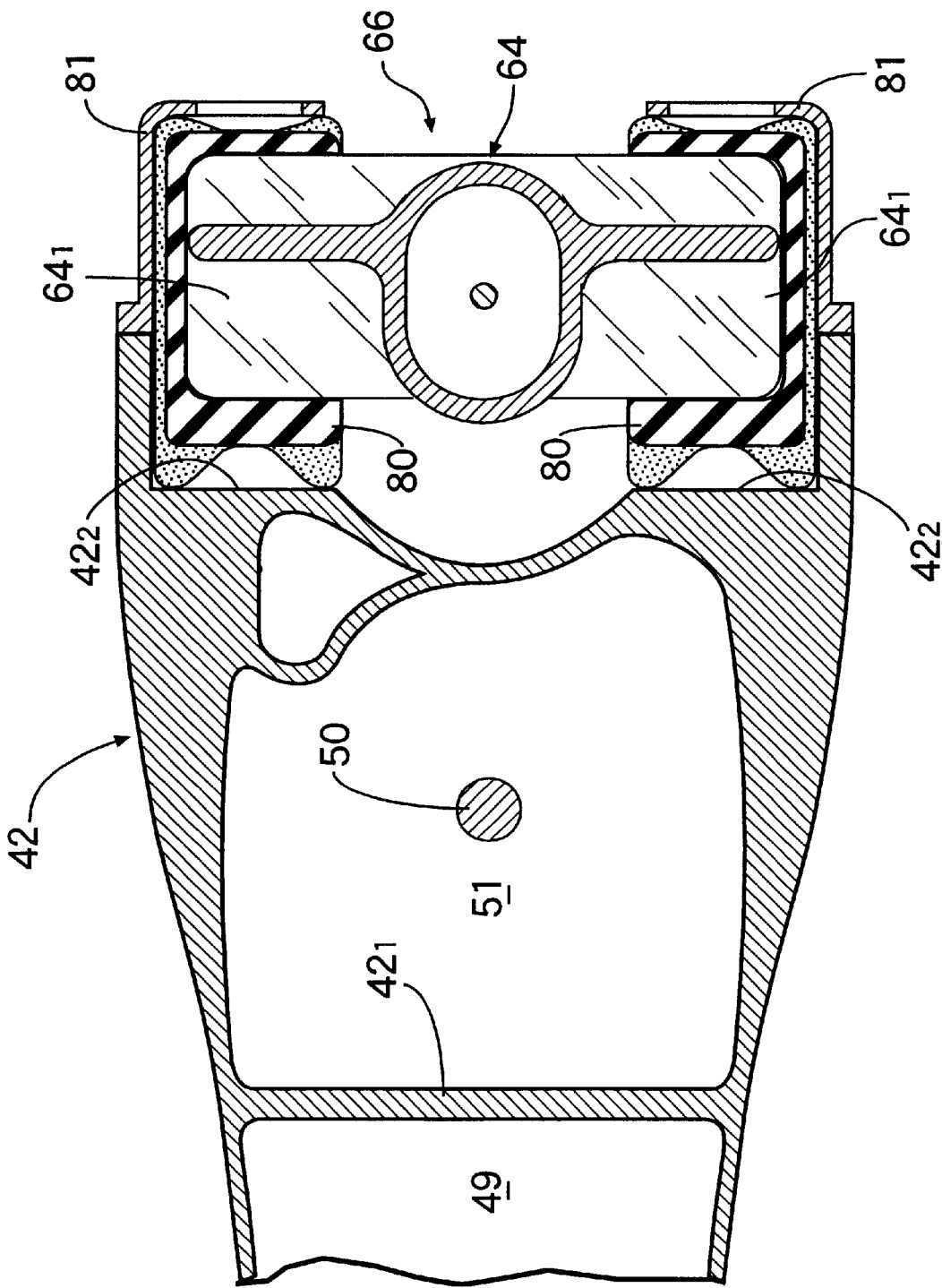

Next, the structure of the lower mount 66 will be described below with reference to FIGS. 11 to 13.

The mount block 64 is fitted over the lower end of the swivel shaft 62 protruding downwards from the swivel case 60, and is fixed to the lower end by two bolts 79, 79. Lower mount rubber members 80, 80 are mounted to cover outer periphery of the metal cores $64_1, 64_1$ protruding laterally from the lower end of the mount block 64. A pair of left and right rubber member-accommodating portions $42_2, 42_2$ are formed on a rear surface of a lower end of the extension case 42, and a pair of left and right cover members 81, 81 are fastened to the extension case 42 by bolts 82, 82 respectively in order to fix the lower mount rubber members 80, 80 fitted into the rubber member-accommodating portions $42_2, 42_2$ from the rear.

The lower end of the extension case 42 is resiliently supported at the lower end of the swivel shaft 62 through the lower mount 66 provided with the lower mount rubber members 80, 80.

Next, the operation of the present embodiment will be described below mainly with reference to FIG. 14.

An inertia force a generated by the reciprocal movements of the pistons 14, 14 in the direction of the straight line $L_1$ (in the longitudinal direction) with the operation of the engine E is countervailed by an inertia force generated in the direction of the straight line $L_1$ by the rotations of the counterweights $15_1$ mounted on the crankshaft 15 with the balance rate of 100%, and hence, the primary vibration in the direction of the straight line $L_1$ is finally relatively small. However, lateral inertia forces c and d generated with the rotation of the counterweights $15_1$ of the crankshaft 15 vibrate the outboard engine system O in the direction of the arc $L_3$ (in the lateral direction) about a phantom vibration center C, and such vibration is transmitted to the hull S through the mounting bracket 55.

The phantom vibration center C is a point on the engine E as a vibration source, which can be construed as being always not moved. The position of the phantom vibration center C is moved depending on the operational state of the engine E, but a phantom vibration center C in a high rotational speed range (of 3,000 rpm or more) of the engine in which the anti-vibration performance of the engine E is particularly a consideration, is contemplated in the present embodiment.

The above-described vibration of the engine E is transmitted from the upper mounts 65, 65 and the lower mount 66 through the mounting bracket 55 to the hull S. During this time, the vibration is reduced by the upper mount rubber members 74, 74 of the upper mounts 65, 65 and the lower mount rubber members 80, 80 of the lower mount 66 and thus, the vibration transmitted to the hull S is weakened. Particularly, in the present embodiment, the lateral vibration is reduced effectively by the upper mounts 65, 65 closer to the engine E which is the vibration source.

More specifically, the vibration in the direction of the arc $L_3$ about the phantom vibration center C is transmitted from the rubber member-accommodating portions 71, 71 of the engine-supporting block 41 supporting the engine E to the upper mount rubber members 74, 74 of the upper mounts 65, 65, but the upper mount rubber members 74, 74 are easily deformed to effectively damp the vibration, thereby reducing the vibration transmitted to the mount arm 63, because the rigidity of the upper mount rubber members 74, 74 in the direction of the vibration (in the direction of the arc $L_3$) are set at the lower value. Thus, it is possible to reduce the vibration transmitted from the mount arm 63 through the swivel shaft 62, the swivel case 60, the swinging arm 59 and the mounting bracket 56 to the hull S to contribute to an enhancement in riding comfort.

The rigidity of the upper mount rubber members 74, 74 in the direction of the straight lines $L_2, L_2$ is set at the high value and for this reason, the vibration in the longitudinal direction cannot be reduced effectively. However, there is not a possibility that the vibration in the longitudinal direction of the engine E may be transmitted through the upper mount rubber members 74, 74 to the hull S, because it is suppressed by the counterweights $15_1$ of the crankshaft 15, as described above.

A portion of the lateral vibration not absorbed by the upper mount rubber members 74, 74 is transmitted from the metal cores 73, 73 to the mount arm 63, but the swinging movement of the mount arm 63 due to the lateral vibration not absorbed by the upper mount rubber members 74, 74 can be suppressed to the minimum, because the axis of the swivel shaft 62 supporting the mount arm 63 for swinging movement is disposed on the arc $L_3$ extending the centers of the upper mount rubber members 74, 74. Thus, it is possible to suppress the transmission of the vibration to the steering handlebar 67 coupled to the mount arm 63 to the minimum.

Meanwhile, to suppress the transmission of the vibration to the steering handlebar 67 to the minimum, it is desirable that the axis of the swivel shaft 62 supporting the mount arm 63 be disposed on the arc $L_3$ extending the centers of the upper mount rubber members 74, 74, as described above. However, to further alleviate the transmission of the vibration to the hull S, it is preferable that the axis of the swivel shaft 62 be displaced longitudinally from the arc $L_3$. This is because if the axis of the swivel shaft 62 is displaced longitudinally from the arc $L_3$, the mount arm 63 to which the lateral vibration not absorbed by the upper mount rubber members 74, 74 has been transmitted is swung about the swivel shaft 62 to function as an anti-vibration link in a sense, thereby alleviating the transmission of the vibration to the hull S.

Longitudinal thrusts e and f generated by the propeller 52 are also transmitted through the upper mount rubber members 74, 74 to the hull S. In this case, the longitudinal thrusts e and t can be transmitted effectively to the hull S, because the rigidity of the upper mount rubber members 74, 74 in the directions of the straight lines $L_2$, $L_2$ is set at a high value. The directions of the straight lines $L_2$, $L_2$, in which the rigidity of the upper mount rubber members 74, 74 is largest, are offset from the directions of the thrusts e and t by the angles α, α, but the angles α, α do not exert a substantial influence, because they are relatively small. It is desirable from such meaning that the angles α, α be small and that the maximum values of the angles α, α be suppressed to a value equal to or smaller than 45°.

In the simple structure in which the rigidity of the upper mount rubber members 74, 74 of the upper mounts 65, 65 only has the anisotropy, as described above, it is possible to ensure that the vibration of the engine E is hard to be transmitted to the hull S and the steering handlebar 67, while permitting the thrusts e and f generated by the propeller 52 to be transmitted effectively to the hull S without the provision of a special balancer device accompanied by the increase of weight and cost.

Figure 15:
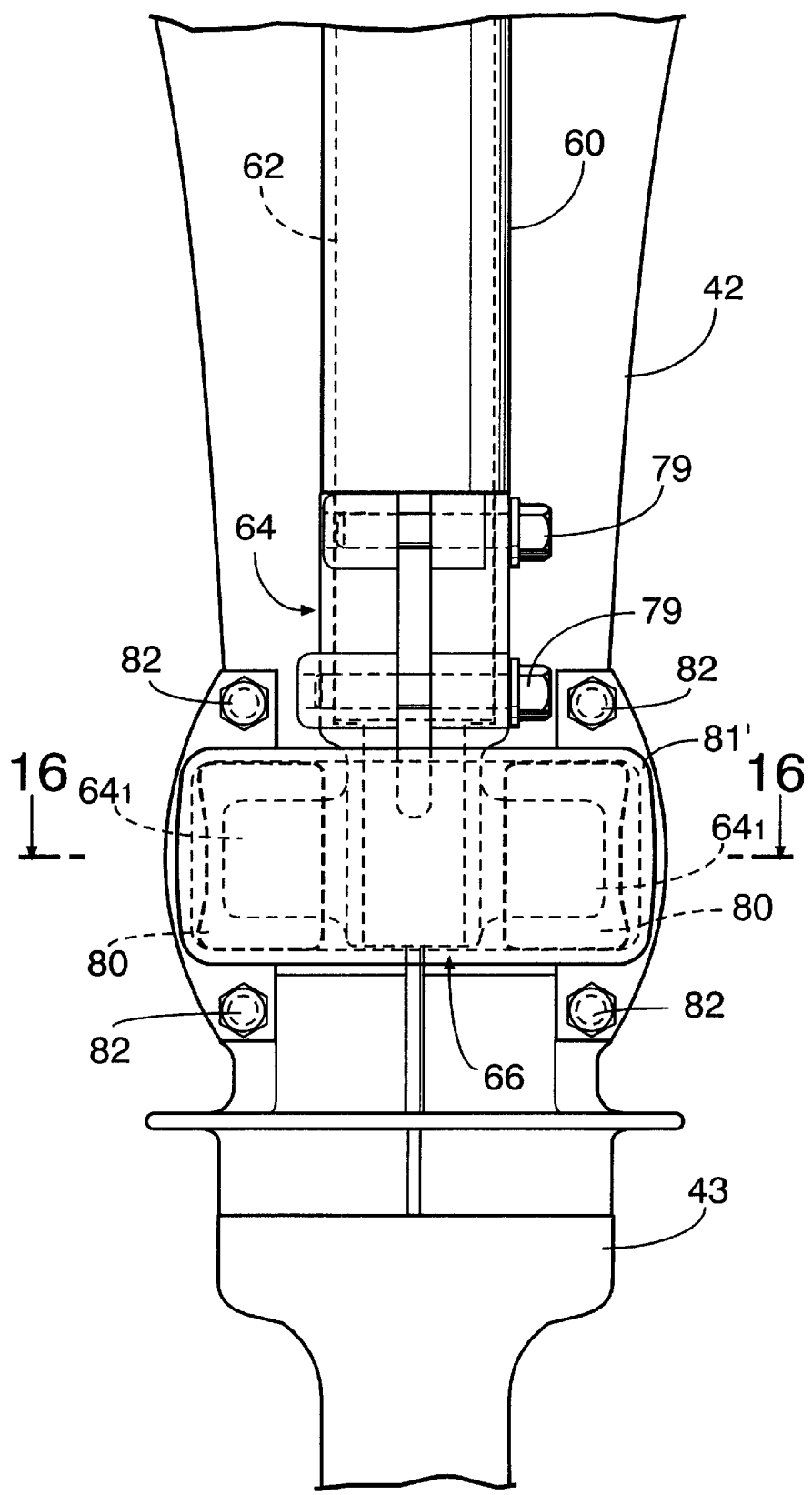
FIGS. 15 and 16 show a second embodiment of the present invention.
Figure 16:
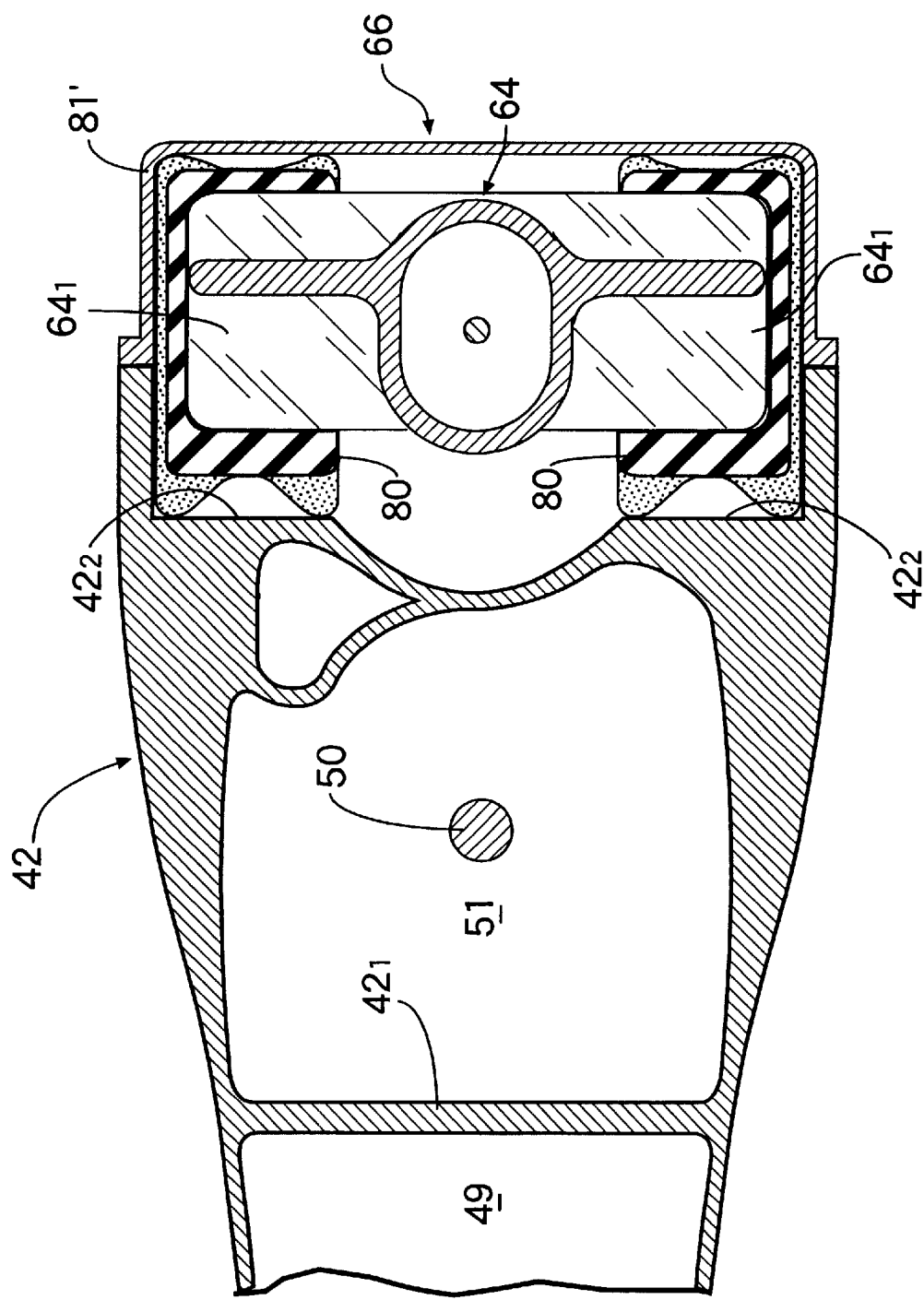

Next, a second embodiment of the present invention will now be described with reference to FIGS. 15 and 16.

The second embodiment has a feature in the structure of a lower mount 66. In the lower mount 66 in the first embodiment, the left and right opposite ends of the mount block 64 have been retained by the pair of cover members 81, 81, but in the second embodiment, a single cover member 81' integrally formed is fastened to a rear surface of a lower end of an extension case 42 by four bolts 82 to retain the mount block 64. The cover member 81' has no opening and covers the rear surface of the mount block 64 completely.

By fastening the single cover member 81' to the rear surface of the lower end of the extension case 42 as described above, the extension case 4 and the cover member 81' cooperate with each other to form a box-shaped structure with a horizontal section closed, leading to an enhanced rigidity. Thus, it is possible to firmly retain the mount block 64 between the extension case 4 and the cover member 81' to effectively prevent the generation of a resonance.

Although the embodiments of the present invention have been described in detail, it will be understood that various modifications in design may be made without departing from the subject matter of the invention defined in claims.

For example, the 2-cylinder and 4-cycle engine has been illustrated in the embodiments, but the present invention is also applicable to another type engine such as a single-cylinder and two-cycle engine.

INDUSTRIAL APPLICABILITY

As discussed above, the present invention is applicable to an outboard engine system including an engine having a crankshaft disposed vertically, and a cylinder axis disposed longitudinally.

What is claimed is:

1. An outboard engine system comprising
   a system body (41),
   an engine (E) mounted on said system body (41),
   a mounting means (55) which is detachably mounted to a hull (S), and
   a mount device (65) having a pair of left and right elastomeric members (74) for supporting said system body (41) on said mounting means (55),
   characterized in that said engine (E) is disposed such that a crankshaft (15) is disposed vertically, and a cylinder head (12) is disposed to face rearwards with a cylinder axis disposed in a longitudinal direction parallel to a propeller shaft (53), and a rate of balance between the reciprocal inertia mass of a piston (14) and a rotational inertia mass of the crankshaft (15) is set at approximately 100%;
   said elastomeric members (74) are disposed on left and right opposite sides of the engine (E), and the rigidity of said mount device (65) is set so that the rigidity in a tangent direction about a phantom center point (C) of vibration in a high rotational speed range of the engine (E) is lower than the rigidity in a radial direction about the phantom center point (C) of vibration.

2. An outboard engine system according to claim 1, wherein an angle (α) formed by a straight line ($L_1$) extending forwards from said phantom center point (C) of vibration with a straight line ($L_2$) extending from said phantom center point (C) of vibration toward said elastomeric member (74) is smaller than 45°.

3. An outboard engine system comprising
   a system body (41),
   an engine (E) mounted on said system body (41),
   a swivel shaft (62) for pivotally supporting said system body (41) on a hull (S),
   a mount arm (63) integral with said swivel shaft (62),
   a mount device (65) having a pair of left and right elastomeric members (74) for supporting said system body (41) on said mount arm (63), and
   a steering handlebar (67) connected to said mount arm (63) to swing said system body (41) about said swivel shaft (62),
   characterized in that said engine (E) is disposed, so that a crankshaft (15) is disposed vertically, and a cylinder head (12) is disposed to face rearwards with a cylinder axis disposed in a longitudinal direction parallel to a propeller shaft (53), and so that a rate of balance between the reciprocal inertia mass of a piston (14) and a rotational inertia mass of the crankshaft (15) is set at approximately 100%;
   said elastomeric members (74) are disposed on left and right opposite sides of the engine (E); the rigidity of said mount device (65) is set so that the rigidity in a tangent direction about a phantom center point (C) of vibration in a high rotational speed range of the engine (E) is lower than the rigidity in a radial direction about said phantom center point (C) of vibration; and
   said swivel shaft (62) is disposed on an arc ($L_3$) of a circle extending through said elastomeric members (74) about said phantom center point (C) of vibration.

4. An outboard engine system according to any of claims 1 to 3, further including a cover member (81') fastened to a rear surface of a lower end of an extension case (42) connected to said system body (41) to define a space with a horizontal section closed, and a mount block (64) which is mounted at a lower end of said swivel shaft (62) and retained in said space.

* * * * *